(12) United States Patent
Konieczny et al.

(10) Patent No.: US 8,164,034 B2
(45) Date of Patent: Apr. 24, 2012

(54) ELECTRICALLY HEATABLE HONEYCOMB CONFIGURATION HAVING SUPPORT PINS

(75) Inventors: Jörg-Roman Konieczny, Much (DE); Rolf Brück, Bergisch Gladbach (DE); Jan Hodgson, Troisdorf (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 142 days.

(21) Appl. No.: 12/627,116

(22) Filed: Nov. 30, 2009

(65) Prior Publication Data

US 2010/0126984 A1 May 27, 2010

Related U.S. Application Data

(63) Continuation of application No. PCT/EP2008/056126, filed on May 19, 2008.

(30) Foreign Application Priority Data

May 31, 2007 (DE) .......................... 10 2007 025 417

(51) Int. Cl.
*H05B 3/06* (2006.01)
*F01N 3/00* (2006.01)

(52) U.S. Cl. .......... 219/520; 219/537; 219/549; 60/300; 60/303; 60/611; 422/174; 422/177; 422/180; 422/211

(58) Field of Classification Search .................. 219/520, 219/537, 549; 60/300, 303; 422/174, 177, 422/180, 188, 211; 29/611
See application file for complete search history.

(56) References Cited

U.S. PATENT DOCUMENTS

| 5,370,943 A | 12/1994 | Brück et al. |
| 5,382,774 A | 1/1995 | Brück et al. |
| 5,413,767 A | 5/1995 | Breuer et al. |
| 5,525,309 A * | 6/1996 | Breuer et al. ................. 422/174 |
| 5,768,889 A | 6/1998 | Maus et al. |
| 2003/0161766 A1 | 8/2003 | Bruck |

FOREIGN PATENT DOCUMENTS

| DE | 9317050 U1 | 3/1995 |
| DE | 4434673 A1 | 4/1996 |
| DE | 10051562 A1 | 4/2002 |
| WO | 9213636 A1 | 8/1992 |
| WO | 9610127 A1 | 4/1996 |

OTHER PUBLICATIONS

International Search Report dated Aug. 21, 2008.

* cited by examiner

*Primary Examiner* — Shawntina Fuqua
(74) *Attorney, Agent, or Firm* — Laurence A. Greenberg; Werner H. Stemer; Ralph E. Locher

(57) ABSTRACT

A configuration contains a first honeycomb body, which is formed by at least one convoluted or wound stack and has a plurality of channels allowing a flow, wherein a first end of the stack is connected to an electric connection and a second end is connected to an electric ground. The stack contains a plurality of sheet metal foils in electric contact with each other, the foils being structured at least in some regions. At the same time, the honeycomb body has support pins for connecting to a second honeycomb body, the pins have a distance of at least 25 mm from each other along the course of the stack at least outside an inner region. A method introduces support pins into the honeycomb body and a device receives a honeycomb body and/or for positioning support pins. The device enables the installation of the support pins in the honeycomb body.

11 Claims, 4 Drawing Sheets

ELECTRICALLY HEATABLE HONEYCOMB CONFIGURATION HAVING SUPPORT PINS

CROSS-REFERENCE TO RELATED APPLICATION

This is a continuation, under 35 U.S.C. §120, of copending international application No. PCT/EP2008/05612, filed May 19, 2008, which designated the United States; this application also claims the priority, under 35 U.S.C. §119, of German patent application No. DE 10 2007 025 417.4, filed May 31, 2007; the prior applications are herewith incorporated by reference in their entirety.

BACKGROUND OF THE INVENTION

Field of the Invention

The present invention relates to a configuration of a first honeycomb body and a second honeycomb body. The first honeycomb body has at least one wound or coiled stack, formed from at least partially structured sheet-metal foils with a multiplicity of ducts which can be traversed by a flow. The first honeycomb body further has support pins which are provided for connecting to a second honeycomb body which is mounted downstream. The invention also relates to a method for inserting support pins into a honeycomb body, and to a suitable device for carrying out such a method.

International patent disclosure WO 92/13636 A1, corresponding to U.S. Pat. Nos. 5,370,943, 5,525,309 and 5,382,774, discloses a honeycomb body arrangement having a plurality of disks which are supported against one another. Here, the honeycomb body arrangement has at least two disks which are spaced apart from one another and are traversed by an exhaust gas in series. To connect the disks to one another, support pins are arranged close to an axis.

Furthermore, international patent disclosure WO 96/10127 A1, corresponding to U.S. Pat. No. 5,768,889, presents an electrically heatable honeycomb body which is supported on a second honeycomb body, which is mounted downstream, both by support pins and also by support elements disposed on the casing of the honeycomb body.

The modern applications for heated honeycomb bodies in exhaust-gas purification systems in motor vehicles have now changed in such a way that use is made in particular of honeycomb bodies with larger cross sections and with simultaneously increasingly thin walls. As a result of an increase in the cross section, which can be traversed by flow, of the heated catalytic converter support bodies, the thin walls are more sensitive to the high thermal and dynamic loading by the exhaust-gas flow.

To thermally insulate the electrically heatable honeycomb body with respect to the exhaust system, and to support and stabilize the thin duct walls of the heated honeycomb body, a relatively large number of support pins should also be used, in particular for relatively large honeycomb bodies. However, the use of more support pins leads to a reduction in the number of ducts, which can be traversed by flow, in the honeycomb body, and simultaneously to an increase in the probability of damage to the ducts or walls of the honeycomb bodies. The ducts or walls can be damaged in particular during production, or during the assembly of honeycomb bodies with the support pins. At the same time, the increase in the number of support pins leads to an increase in weight, and is at the same time a significant cost factor first in terms of production but second also in the provision of material for said exhaust-gas components.

SUMMARY OF THE INVENTION

It is accordingly an object of the invention to provide an electrically heatable honeycomb configuration having support pins which overcome the above-mentioned disadvantages of the prior art methods and devices of this general type, which, even in the case of a large diameter, can attain a high level of stability of the structure, and a high level of effectiveness with regard to exhaust-gas purification, using only a small number of support pins. At the same time, the honeycomb body should be light and cheap to produce. It is also sought to propose a method and a device for inserting support pins of the type via an end side of the honeycomb body, which device arranges the support pins at the desired positions in a simple and gentle manner.

Here, the object is achieved by an arrangement or configuration, having a first honeycomb body which is formed with at least one wound or coiled stack and which has a plurality of ducts which can be traversed by a flow. A first end of the stack is connected to an electrical terminal and a second end is connected to an electrical ground. The stack has a multiplicity of at least partially structured sheet-metal foils which are in electrical contact with one another, and the honeycomb body has support pins for connecting to a second honeycomb body. The support pins, at least outside an inner region, have a spacing from one another along the profile of the stack of at least 25 mm.

Instead of the second honeycomb body, it is of course also possible for another support body to be connected to the first honeycomb body by the support pins.

With regard to the different possible configurations of the electrical terminals of the honeycomb body, reference may be made in particular to the applicant's documents cited in the introduction.

The spacing of the support pins from one another along the profile of the stack is preferably, at least outside the inner region, at least 30 mm or even at least 35 mm. Here, the reference to the spacing along the profile of the stack means that only the spacings of support pins which are arranged adjacent to one another within a stack are considered. The profile of the stack is accordingly dependent on the profile of the sheet-metal foils. Therefore, the spacing does not refer to the spacing between support pins which, in the case of a coiled stack, may duly be arranged adjacent to one another but for which at least one stack boundary is crossed when determining the spacing.

Load tests have shown that it is specifically the spacing along the stack profile and/or along the sheet-metal foil profile that is significant for the stable fixing of the honeycomb body. It is thereby possible in particular to obtain a distribution of the support pins, which is suitable for the spatial arrangement of the stack, taking into consideration the coil direction or winding direction of the honeycomb body, which distribution is permanently durable even in use in a mobile exhaust system arranged close to the engine. However, depending on the winding type, the surprisingly large spacing may possibly be insufficient in the central inner region, such that specifically here, a small number of support pins are if appropriate arranged along the profile closer to one another— this applies in particular for turns or bends which are formed virtually in the manner of a fold. The spacings specified here are suitable in particular for sheet-metal foils which satisfy at least one of the following parameters: slotted or perforated metal sheets, metal sheets with a thickness of less than 80 micrometers or even less than 60 micrometers, sheet-metal foils with a length of greater than 500 mm or even 1000 mm, sheet-metal foils with a width of less than 40 mm or even 20 mm.

It has been found that the relatively large spacing of the support pins from one another does not lead to critical resonance frequencies of the honeycomb body, and therefore there are no risks, as previously expected, from this aspect. Furthermore, as a result of the relatively large spacing of the support pins, a certain degree of vibration may be deliberately accepted. The vibration can lead to a separation of soot particles within the honeycomb body and/or within the second support body arranged downstream, which soot particles can then be removed from the exhaust-gas flow for example by a downstream particle filter. This permits a higher level of efficiency in terms of exhaust-gas purification, and also a longer service life expectation for the honeycomb body.

According to a further refinement of the arrangement, it is proposed that at least the support pins outside the inner region are distributed over the cross-sectional area of the honeycomb body in such a way as to be at a distance of at least 25 mm from one another. The distance should preferably be at least 30 mm and particularly advantageously at least 35 mm. The "distance", in contrast to the above-described "spacing" of the support pins from one another, also encompasses the crossing of stack boundaries. The "distance" is therefore also used, for example, within a (for example very high) stack. Furthermore, it is also possible in this way for the position of a supporting pin to be adapted with respect to the height of the stack if the criterion of the "spacing" along the stack profile is met. This applies in particular if sufficient stability of the first honeycomb body, obtained if appropriate by at least one local "internal" bracket (that is to say a bracket which acts only on the first honeycomb body), is provided between adjacent support pins.

According to a further refinement of the arrangement, a diameter of the first honeycomb body is at least 100 mm. In a preferred form, the diameter is at least 150 mm, and in a particularly preferred form, the diameter is at least 200 mm. The diameter of the second honeycomb body or support body is preferably at least as great as that of the first honeycomb body.

According to one refinement of the arrangement, it is proposed that at least one support pin is dimensioned so as to fill the duct in which it is positioned in such a way that the support pin is in contact with the surrounding walls, which form the duct, over at least 50% of a circumference situated in the honeycomb body. Here, the duct may be formed by at least one sheet-metal foil, a sheet-metal foil and a housing section, a sheet-metal foil and insulation, etc. Furthermore, the support pin may also be positioned within slots which are formed with other likewise insulating structures of the honeycomb body. The encompassing of the support pin by the duct wall ensures sufficient hold during production and in later use. Here, the cross section of the support pin may if appropriate be slightly larger than the mean duct cross section, but this should not exceed 10% or even only 5%.

In particular, the at least one support pin is in contact with the surrounding walls over at least 75% of its circumference situated in the honeycomb body, or is in contact with the surrounding walls even over at least 95% of its circumference.

It is particularly advantageous if the support pins engage into the second honeycomb body up to a depth of at most 8 mm. It is preferable for the support pins to extend into the second honeycomb body up to a depth of at most 5 mm and particularly preferably up to a depth of at most 3 mm. Here, it is sought in particular to prevent secondary structures within the ducts of the second honeycomb body from being destroyed by the insertion of the support pins. Secondary structures are for example holes, slots, lugs, transverse microstructures or even flow deflections, the purpose of which is for example to provide improved mixing of the exhaust-gas flow and which are used in addition to, or superposed on, corrugated structures of the sheet-metal foils, such as are common in the generally known prior art.

According to one particularly preferred refinement of the arrangement, at least one support pin has at least one tip which is arranged eccentrically with respect to a central axis of the support pin. It is also particularly advantageous for at least one support pin to have at least one tip which is arranged in alignment with the lateral surface of the support pin.

According to a further refinement, the at least one stack of the first honeycomb body has a height of at least 10 mm. The stack preferably has a height of at least 20 mm and particularly preferably of at least 30 mm. The above statement with regard to the design of the spacings and distances of the support pins may be adhered to here with a wide scope for variation, such that, for example, a particularly low number of support pins may be used, which may lead to a considerable cost advantage (specifically in the case of very large honeycomb bodies). The height of the stack can be seen when viewing the cross-sectional area of a honeycomb body, and relates to the stack height of the common sheet-metal foils which are wound with one another, or the stacks which are electrically insulated from one another.

According to one advantageous refinement, the inner region of the first honeycomb body encompasses at most 20% of a cross-sectional area of the first honeycomb body. According to one particularly advantageous refinement, the inner region takes up at most 10% of the cross-sectional area. In honeycomb bodies which do not have a cylindrical shape but are rather of for example conical configuration, the cross-sectional area can be assumed as being the greatest cross-sectional area, since the larger cross-sectional area usually faces toward the second honeycomb body. As already stated, the size of the inner region is dependent on the manner in which the stacks are coiled. Since, for this purpose, a coil type is selected which substantially fills the desired cross-sectional area, the inner region preferably has a shape (round, angular, elliptical . . . ) which substantially corresponds to the (outer) shape (and alignment) of the cross-sectional area.

Against the background of automated production of a heatable honeycomb body, or an arrangement of a heatable first honeycomb body with a second honeycomb body or a support body, the invention also proposes a method for inserting support pins into ducts or slots of a first honeycomb body, in which method support pins are positioned by a retaining device, and the support pins are placed into engagement in the ducts or slots by excitation transversely with respect to the feed movement of the first honeycomb body and of the retaining device relative to one another. Here, slots are for example the regions for insulating sheet-metal stacks from one another. A "transverse excitation" is to be understood in particular to mean a type of vibration movement which may for example be aligned perpendicular to the feed movement. The transverse excitation is preferably carried out with a constant frequency and amplitude, but this is not strictly necessary. The feed movement is aligned in particular with respect to the position of the ducts of the second honeycomb body, and is preferably parallel thereto.

According to one refinement of the method, the support pins are subsequently arranged, together with the first honeycomb body, on a second honeycomb body such that a gap separates the two honeycomb bodies, and the support pins are fixed to the honeycomb bodies by a soldering process. The gap is preferably only a few millimeters in size, for example 5 to 10 mm. The soldering process preferably includes a high-temperature vacuum brazing process.

The method may in particular also be integrated into the production of arrangements according to the invention or of honeycomb bodies, which will be described below.

For this purpose, support pins are separated such that they can be gripped separately or as a group by a manipulator, with the support pins then being fed to a retaining device or arrangement matrix, and inserted, and thereby positioned, in the retaining device or arrangement matrix in particular by a measuring system. The retaining device has in particular one or more precisely predefined positioning facilities in which the support pins can be held and clamped. Furthermore, the honeycomb body is positioned in front of the retaining device, with an impact plate being arranged on the honeycomb body on the side facing away from the retaining device, by which impact plate the honeycomb body can be fixed or else held and transported.

The excitation transversely (obliquely or even substantially perpendicularly) to the feed movement of the honeycomb body may now be generated by an excitable impact plate or by an excitable retaining device for the support pins. It is however preferable here for the impact plate to which the honeycomb body is fixed to be excitable, since the impact part therefore remains as part of the device for the further production steps, in particular for the assembly of the first honeycomb body and second honeycomb body. The excitation of the support pins transversely to the actual feed movement of the honeycomb body and retaining device relative to one another has the result that a collision of the support pin tips with the sheet-metal foils of the honeycomb body is prevented or released as a result of vibration, oscillation or similar generated transverse movements, such that insertion into the structure of the honeycomb body is possible without problems, and the duct walls of the honeycomb body therefore remain undamaged.

The retaining device and the honeycomb body are, if appropriate, moved relative to one another until the support pins abut against the impact plate, such that the support pins extend completely through the first honeycomb body and are thereby provided with a maximum fixing action. The retaining device can now be removed from the support pins, and a further support body or a second honeycomb body positioned in front of the first honeycomb body. It is possible here, too, for either the second honeycomb body or the first honeycomb body to be subjected to excitation by the impact plate, such that the support pins can be inserted into the second honeycomb body or into the support body up to a predetermined depth.

As a result of the excitation described here for improved insertion of the support pins into the very filigree structure of the honeycomb body, it is possible to dispense with complex and expensive manual assembly of the support pins in the honeycomb body, and in particular to enable automated production of said exhaust-gas purification arrangement.

The support pins may subsequently, or else after being fixed in the first honeycomb body, be fixed in the ducts of the honeycomb body or in the support body by a soldering or brazing process.

The device according to the invention, which the invention also encompasses, is configured for holding a first honeycomb body or for positioning support pins, with the device being excitable in such a way that the device can move substantially transversely with respect to the direction of extent of the ducts or slots of the first honeycomb body or with respect to a central axis of the support pins.

The device according to the invention may thus hold and impart excitation either to the first honeycomb body, to the retaining device for the support pins or to the second honeycomb body.

Honeycomb bodies which do not have a coaxial extent of ducts, but which are rather coiled in conical fashion or else have wound ducts which can be traversed by flow, may also be produced by a device of the type or by a method of the type. The excitement of the assembly devices serves in particular only for the initial insertion of the support pins into existing duct openings. It is of course correspondingly necessary for either the support pins or the retaining devices of the support pins to be configured so as to enable a honeycomb body or a further support body to be pushed together.

Other features which are considered as characteristic for the invention are set forth in the appended claims.

Although the invention is illustrated and described herein as embodied in an electrically heatable honeycomb configuration having support pins, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The present invention is not restricted to the illustrated exemplary embodiments. In fact, numerous modifications to the invention are possible within the scope of the patent claims. For example, instead of the cylindrical honeycomb body which is shown, it is also possible to use conically shaped honeycomb bodies. Furthermore, the invention is not restricted to ducts which extend rectilinearly, but rather is also suitable for wound ducts or ducts which extend obliquely with respect to the longitudinal axis. Likewise, the honeycomb bodies need not be formed from wound stacks, but rather may also have been produced from one coiled stack.

Figure 1:
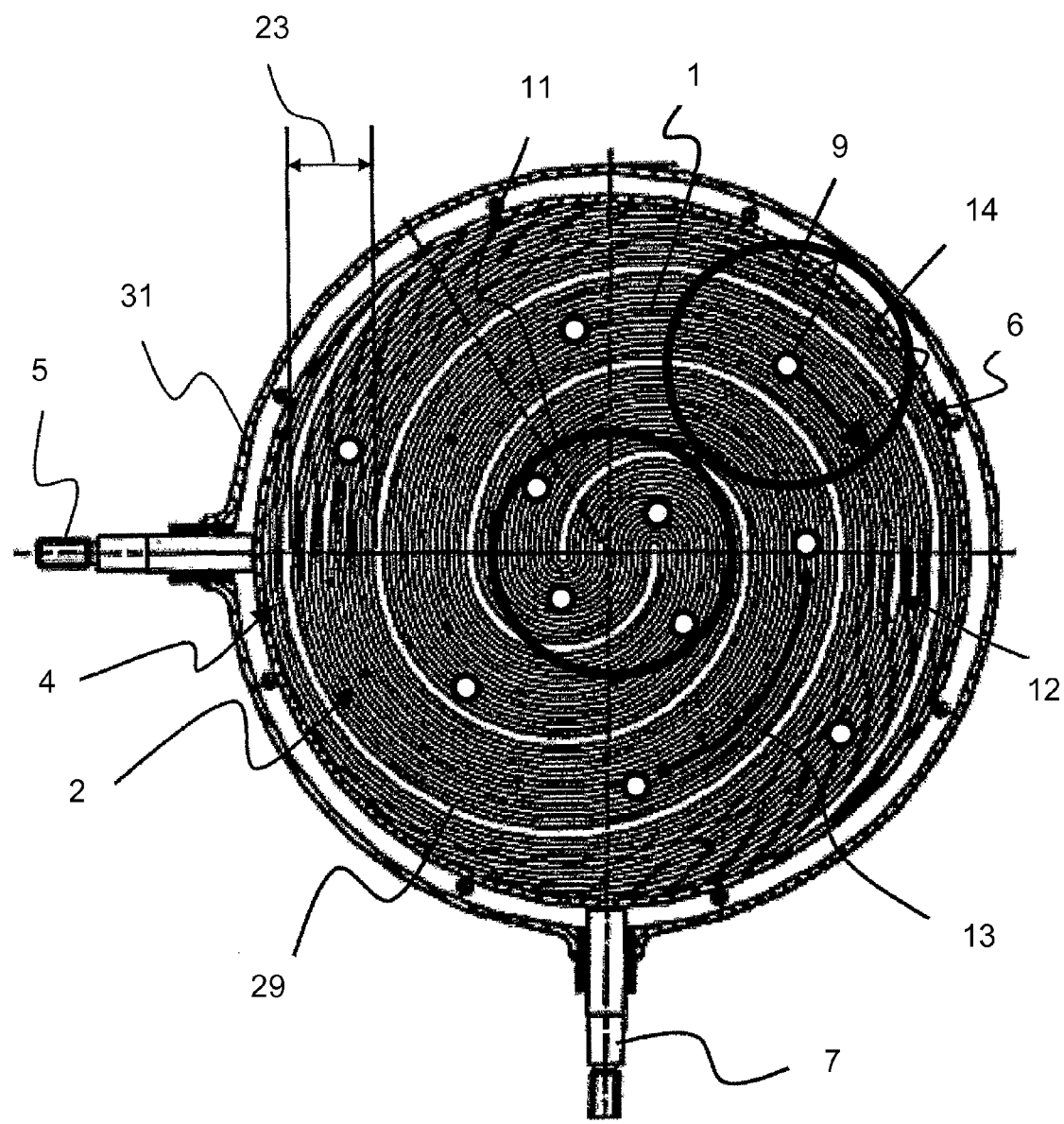
FIG. 1 is a diagrammatic, cross-sectional view through an electrically heatable honeycomb body according to a first exemplary embodiment of the invention.

Referring now to the figures of the drawing in detail and first, particularly, to FIG. 1 thereof, there is shown schematically a cross-sectional view of a honeycomb body 1 in a housing 31 which is formed from one stack 2 and which has ducts 3 which are formed by partially structured sheet-metal foils 8 and in which support pins 9 are arranged. Slots 29 serve to insulate the stack windings from one another. Furthermore, the honeycomb body 1 has a cross-sectional area 12 and an electrical terminal 5 at a first end 4 of the stack 2 and, at a second end 6, an electrical ground 7 for producing a current flow through the honeycomb body 1, as a result of which the latter is heated. Furthermore, the stack 2 has a height 23, and the honeycomb body 1 has an inner region 11. The spacing 13 shows the difference between the spacings between support pins along the profile of the stack 2 outside the inner region 11 and distance 14 (surroundings) of support pins which are distributed over the cross section 12 outside the inner region 11.

Figure 2:
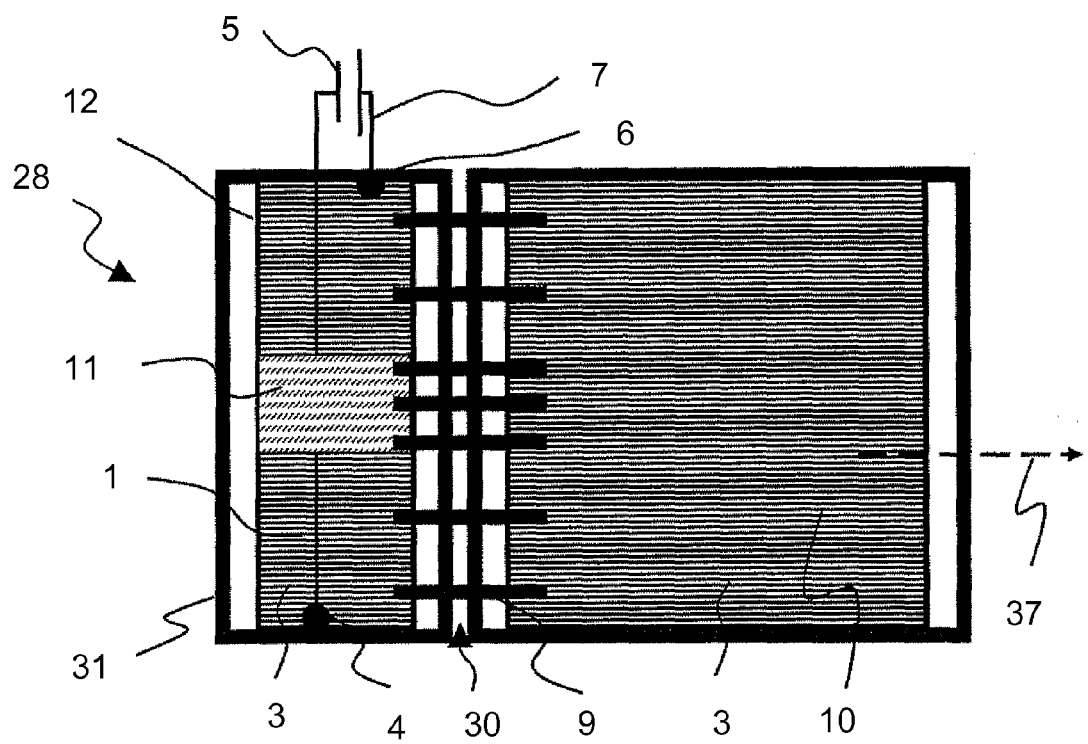
FIG. 2 is a side view of the heatable honeycomb body upstream of a support body, which is mounted downstream.

FIG. 2 schematically shows, in a side view, a configuration 28 of the first honeycomb body 1 with a second honeycomb body 10 within the housing 31. Here, the honeycomb body 1, with the cross-sectional area 12, is supported with the inner region 11 in the second honeycomb body 10 or in the further support body by the support pins 9 in such a way that a gap 30 is maintained between the two honeycomb bodies 1, 10. The first honeycomb body 1 is contacted by the electrical terminal 5 at a first end 4 of a stack 2 and by the electrical ground 7 at a second end 6 of a stack 2. In the flow direction 37, the exhaust-gas flow flows first through the ducts 3 of the first honeycomb body 1, is heated by the latter if required, and then flows through the downstream second honeycomb body or through the further support body 10.

Figure 3:
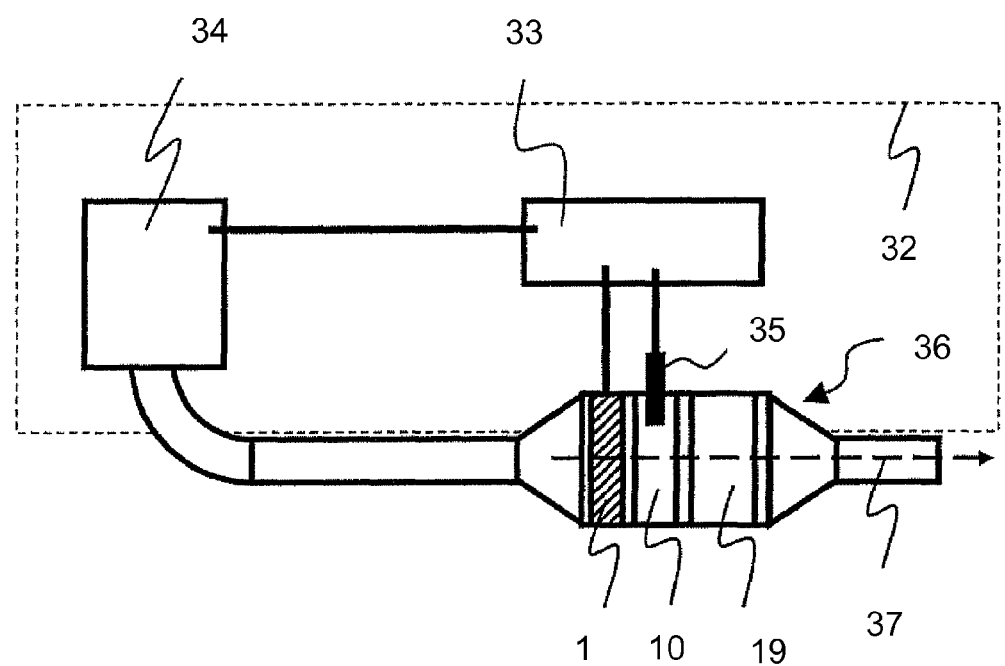
FIG. 3 is an illustration of the honeycomb body as part of an exhaust-gas purification device.

FIG. 3 schematically shows the configuration 28 according to the invention as part of an exhaust system 36 of a motor vehicle 32. An exhaust-gas flow flows in a flow direction 37 from an internal combustion engine 34 through the configuration 28, composed of (preferably at least partially catalytically coated) honeycomb bodies 1 and 10, and via a further exhaust-gas purification component 19, for example a particle filter, into the environment. Here, the exhaust system 36 may have a sensor 35 which, together with the heatable first honeycomb body 1, is connected to a control unit 33 which controls the heating of the first honeycomb body 1 as a function of engine characteristic values and sensor data.

Figure 4:
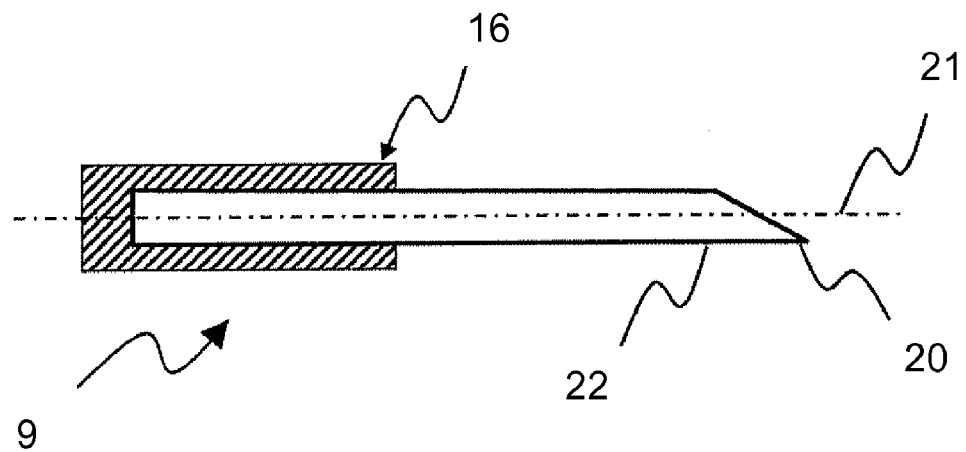
FIG. 4 is a diagrammatic, side view a support pin.

FIG. 4 shows, in a side view, the support pin 9, which has a central axis 21 and at least one tip 20, wherein the tip 20 may be arranged either centrally with respect to a circumference 16 of the support pin 9 or eccentrically, and in particular in alignment with a lateral surface 22 of the support pin 9. The tip 20 serves in particular to enable the insertion or positioning of the support pin 9 in the duct 3 of the honeycomb body, with it being sought to prevent damage to the duct 3 or to duct walls 17 as a result of the support pin 9 colliding with the front thereof during assembly. Also shown, in the opposite section of the tip, is electrical insulation (shown with hatching) which defines a largest circumference 16 of the support pin 9, which circumference 16 in particular interacts with the first honeycomb body 1.

The eccentrically arranged tip 20 of the support pin 9 may, with corresponding microstructures or secondary structures of the ducts 3 of the honeycomb bodies 1 and 10 or of further support bodies, prevent damage to the structures, and in particular prevent the support pin 9 from sliding out of the duct 3 into an adjacent duct 3 as a result of guide blades or similar secondary structures. In this case, the tip 20 will nestle against the smooth duct wall 17 and, as a result of the beveled tip 20, will displace any existing secondary structures or microstructures without being pushed out of the anticipated path by the latter. For this purpose, it is necessary, if appropriate, for the support pins 9 to be aligned in a particular way corresponding to the arrangement of the tip 20 and depending on the position thereof in the honeycomb bodies 1, 10. It may likewise be necessary for the secondary structures or microstructures in the ducts 3 to be aligned, according to their position in the honeycomb body 1, 10, in such a way that the tip 20 of the support pin 9 does not engage into said secondary structures or microstructures, but rather merely displaces the latter.

Figure 5:
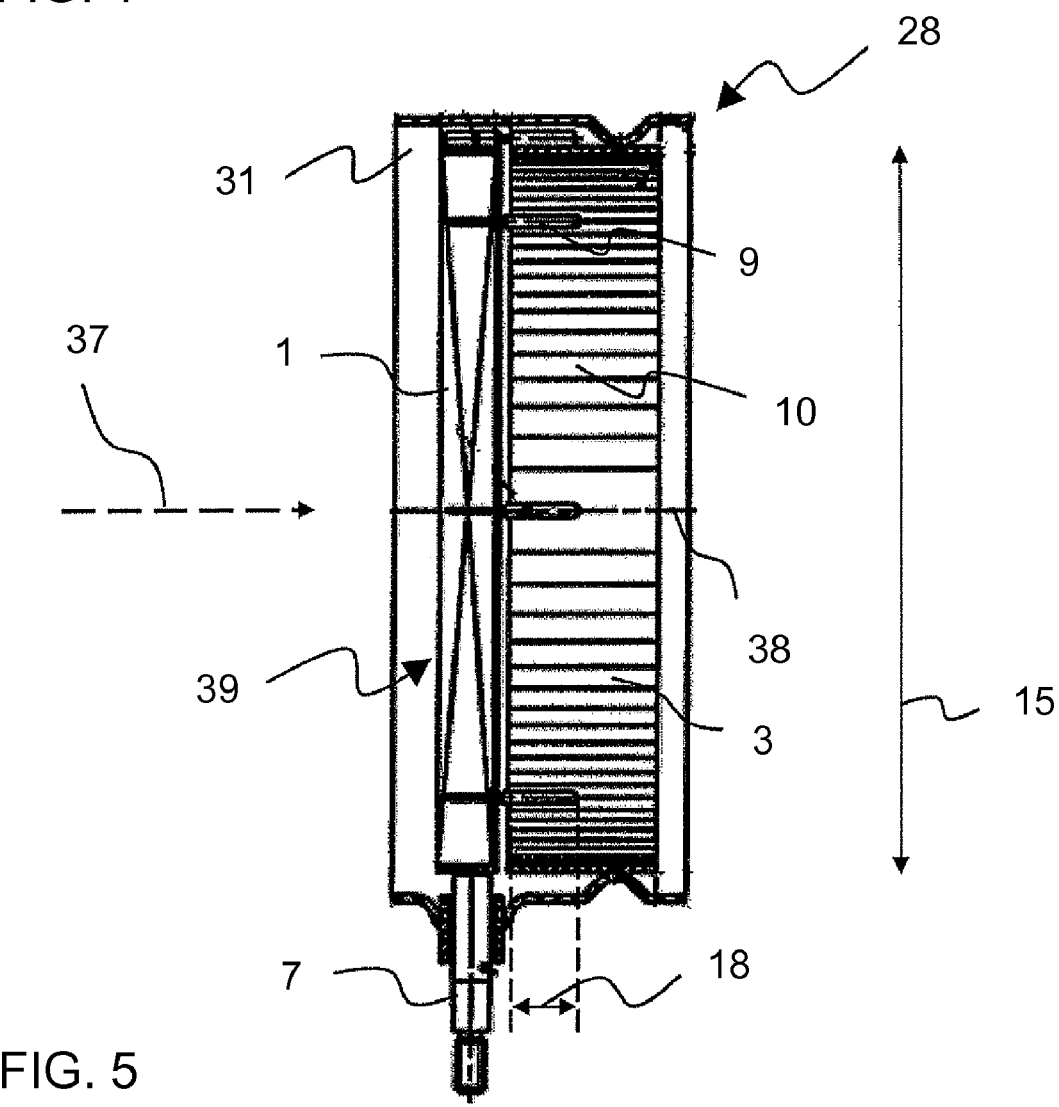
FIG. 5 is a diagrammatic, side view of a further variant of the arrangement according to the invention.

FIG. 5 schematically shows a side view of the configuration 28 of the first honeycomb body 1 with a second honeycomb body 10 in the common housing 31. Here, the honeycomb body 1, with a diameter 15, is supported in the second honeycomb body 10, or in the further support body, by the support pins 9 which are arranged in ducts 3 of the second honeycomb body 10 or of the further support body only up to a depth 18. The exhaust-gas flow enters into the honeycomb body 1 via end surface 39, is heated by the honeycomb body 1 and then flows through the second honeycomb body 10, which is arranged downstream along the longitudinal axis 38.

Figure 6:
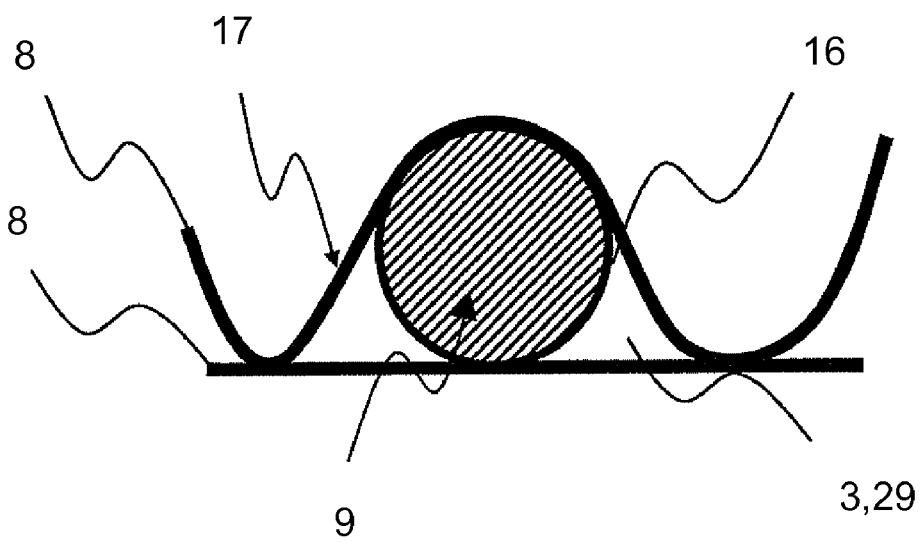
FIG. 6 is an illustration of the support pin in a duct.

FIG. 6 shows the support pin 9 within the duct 3 which may be formed by sheet-metal foils 8 or else by sheet-metal foils 8 with the housing 31 of the honeycomb body 1, or the support pin 9 within the slot 29 which is formed with other, likewise insulating structures of the honeycomb body 1. Here, the support pin 9 is contacted at its circumference 16 by the walls 17, and may be fixed first by frictional contact, and second also by a clamping action generated by a widening of the duct 3 and/or of the slot 29 caused by the insertion of the support pin 9. Accordingly, the support pin 9 may also have larger diameters than the corresponding diameter of the duct 3 and/or extent of the slot 29. The support pin 9 may be fixed by brazing during the course of the production of the honeycomb body 1, and/or during the production of the exhaust-gas purification arrangement composed of the honeycomb body 1 and second honeycomb body 10.

Figure 7:
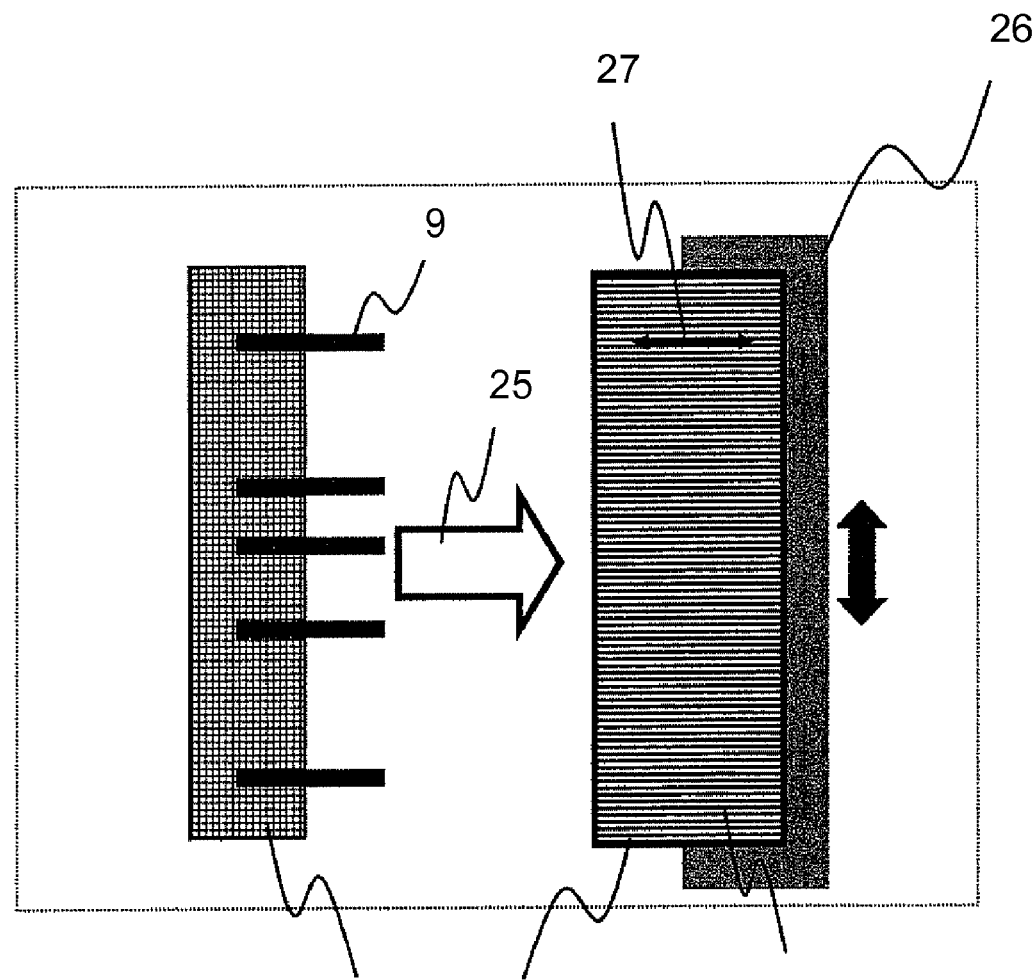
FIG. 7 is an illustration of a production process for a honeycomb body having support pins.

FIG. 7 schematically shows the method for assembling the honeycomb bodies 1, 10 and the support pins 9, with the support pins 9 being held in a retaining device 24 and being moved to the honeycomb body 1 by a feed movement 25. Here, the honeycomb body 1 is fixed by a device 26. According to FIG. 7, the retaining device 24 is subjected to excitation transversely with respect to the feed movement 25 in such a way that the support pins 9 can be inserted into the ducts 3 of the honeycomb body 1 without damaging the structures and/or sheet-metal foils 8 of the honeycomb body 1. The feed process of the components 24, 1, 10 may be monitored and controlled by further sensors. Furthermore, it is of course also (alternatively or additionally) possible for the retaining device 24 to perform a lateral movement (oscillation).

The invention claimed is:
1. A configuration, comprising:
an electrical terminal;
an electrical ground terminal; and
a first honeycomb body having at least one stack being one of wound and coiled, said stack having a plurality of ducts formed therein and can be traversed by a flow, said stack having a first end connected to said electrical terminal and a second end connected to said electrical ground terminal, said stack having a multiplicity of at least partially structured sheet-metal foils which are in electrical contact with one another, said first honeycomb body having support pins for connecting to a second honeycomb body, said support pins, at least outside an inner region, have a spacing from one another along a profile of said stack of at least 25 mm.
2. The configuration according to claim 1, wherein said support pins outside said inner region being distributed over a cross-sectional area of said first honeycomb body in such a way as to be at a distance of at least 25 mm from one another.

3. The configuration according to claim 1, wherein said first honeycomb body has a diameter of at least 100 mm.

4. The configuration according to claim 1, wherein at least one of said support pins is dimensioned so as to fill said duct in which it is positioned in such a way that said support pin is in contact with surrounding walls, which define said duct, over at least 50% of a circumference situated in said first honeycomb body.

5. The configuration according to claim 1, wherein said support pins engaging into the second honeycomb body up to a depth of at most 8 mm.

6. The configuration according to claim 1, wherein at least one of said support pins has at least one tip which is disposed eccentrically with respect to a central axis of said support pin.

7. The configuration according to claim 1, wherein said at least one stack of said first honeycomb body has a height of at least 10 mm.

8. The configuration according to claim 1, wherein said inner region of said first honeycomb body encompassing at most 20% of a cross-sectional area of said first honeycomb body.

9. A method for inserting support pins into one of ducts and slots of a first honeycomb body, which comprises the steps of:
    positioning the support pins via means of a retaining device; and
    placing the support pins into engagement in the ducts or the slots by means of an excitation transversely with respect to a feed movement of the first honeycomb body and of the retaining device relative to one another.

10. The method according to claim 9, which further comprises subsequently disposing the support pins, together with the first honeycomb body, on a second honeycomb body such that a gap separates the first and second honeycomb bodies, and the support pins are fixed to the first and second honeycomb bodies by means of a brazing process.

11. A device for holding one of a first honeycomb body and for positioning support pins, with the device being excitable in such a way that the device can move substantially transversely with respect to a direction of extent of ducts or slots of the first honeycomb body or with respect to a central axis of the support pins.

* * * * *